US010290839B2

(12) United States Patent
Modeki

(10) Patent No.: US 10,290,839 B2
(45) Date of Patent: May 14, 2019

(54) SECONDARY BATTERY

(71) Applicant: NEC ENERGY DEVICES, LTD., Sagamihara-shi, Kanagawa (JP)

(72) Inventor: Akihiro Modeki, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 103 days.

(21) Appl. No.: 15/305,688

(22) PCT Filed: Mar. 10, 2015

(86) PCT No.: PCT/JP2015/057000
§ 371 (c)(1),
(2) Date: Oct. 21, 2016

(87) PCT Pub. No.: WO2015/163025
PCT Pub. Date: Oct. 29, 2015

(65) Prior Publication Data
US 2017/0040576 A1 Feb. 9, 2017

(30) Foreign Application Priority Data

Apr. 25, 2014 (JP) ................ 2014-091108

(51) Int. Cl.
*H01M 2/02* (2006.01)
*H01M 10/0585* (2010.01)
(Continued)

(52) U.S. Cl.
CPC ....... *H01M 2/0285* (2013.01); *H01M 2/0287* (2013.01); *H01M 2/14* (2013.01);
(Continued)

(58) Field of Classification Search
CPC ............. H01M 2/0285; H01M 2/0287; H01M 10/0585; H01M 2/14; H01M 2/34; H01M 2/18; H01M 10/04
See application file for complete search history.

(56) References Cited

U.S. PATENT DOCUMENTS 5,441,824 A    8/1995   Rippel
2004/0265688 A1*   12/2004   Arao ................ B32B 7/10
                                                                     429/176

FOREIGN PATENT DOCUMENTS

CN    101743661 A    6/2010
CN    102956862 A    3/2013
(Continued)

OTHER PUBLICATIONS

English machine translation of JP2005-285554 (Year: 2005).*
(Continued)

*Primary Examiner* — Lisa S Park
(74) *Attorney, Agent, or Firm* — Sughrue Mion, PLLC

(57) ABSTRACT

Secondary battery 100 comprises: battery electrode assembly (electrode laminate) 4 that includes positive electrodes 1 and negative electrodes 2 that overlap each other with separator 3 interposed therebetween; and conductive adhesive tape 5 which has a multilayer structure including adhesive layer 5a and conductive layer 5b, wherein adhesive layer 5a has conductivity and adhesiveness and adheres to a surface of battery electrode assembly 4, conductive layer 5b is laminated on adhesive layer 5a, and conductive adhesive tape 5 has electric resistance of 1.0 Ω/cm² or less in a thickness direction and covers at least a part of an outer peripheral portion of battery electrode assembly 4 by being wound around said part.

8 Claims, 5 Drawing Sheets

(51) Int. Cl.
*H01M 2/14* (2006.01)
*H01M 2/18* (2006.01)
*H01M 2/34* (2006.01)
*H01M 10/04* (2006.01)

(52) U.S. Cl.
CPC ............... *H01M 2/18* (2013.01); *H01M 2/34* (2013.01); *H01M 10/04* (2013.01); *H01M 10/0585* (2013.01)

(56) References Cited

FOREIGN PATENT DOCUMENTS

| | | |
|---|---|---|
| EP | 0854529 A1 | 7/1998 |
| JP | 1-232657 A | 9/1989 |
| JP | 10-40959 A | 2/1998 |
| JP | 2000-353502 A | 12/2000 |
| JP | 2001015152 A | 1/2001 |
| JP | 2003151513 A | 5/2003 |
| JP | 2004179091 A | 6/2004 |
| JP | 2005-285554 A | 10/2005 |
| JP | 2005-294150 A | 10/2005 |
| JP | 2008-91099 A | 4/2008 |
| JP | 2008-117604 A | 5/2008 |
| JP | 2008-130360 A | 6/2008 |
| JP | 2013-114929 A | 6/2013 |
| JP | 5351481 B2 | 11/2013 |

OTHER PUBLICATIONS https://hypertextbook.com/facts/2004/ValPolyakov.shtml. (Year: 2004).*
International Search Report for PCT/JP2015/057000 dated May 19, 2015.
Communication dated Apr. 28, 2018, from the State Intellectual Property Office of People's Republic of China in counterpart Application No. 201580021882.2.
Decision to Grant a Patent dated Dec. 11, 2018 from the Japanese Patent Office in application No. 2016-514804.

* cited by examiner

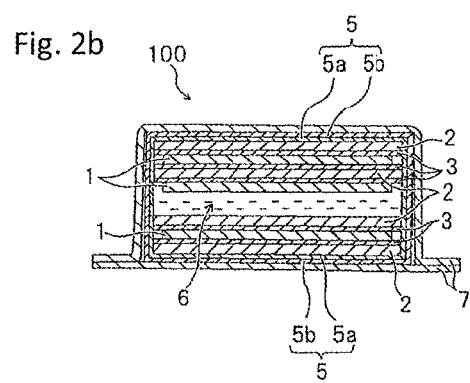
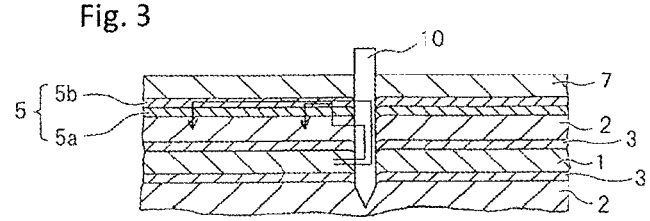

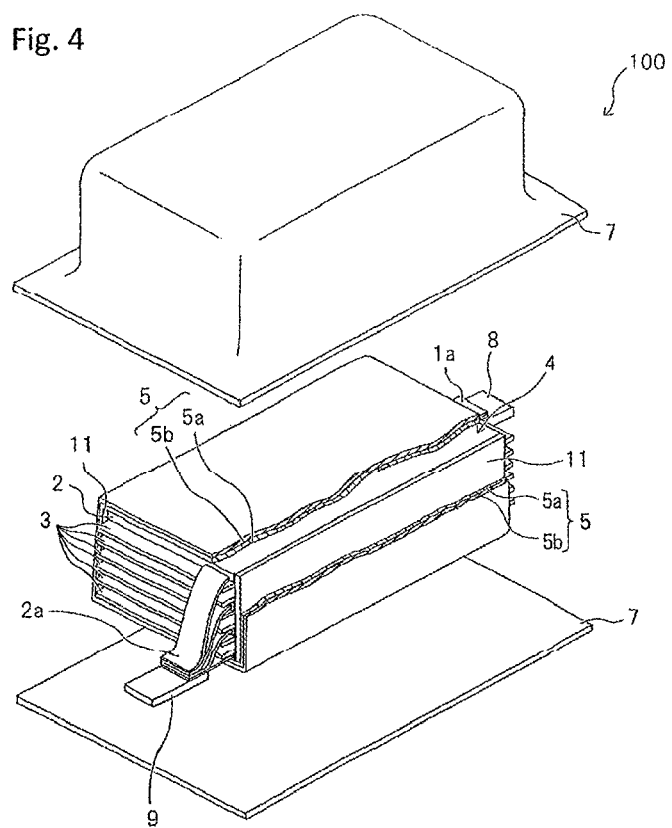

SECONDARY BATTERY

CROSS REFERENCE TO RELATED APPLICATIONS

This application is a National Stage of International Application No. PCT/JP2015/057000 filed Mar. 10, 2015, claiming priority based on Japanese Patent Application No. 2014-091108 filed Apr. 25, 2014, the contents of all of which are incorporated herein by reference in their entirety.

TECHNICAL FIELD

The present invention relates to a secondary battery including a positive electrode and a negative electrode that overlap each other, with a separator interposed therebetween.

BACKGROUND ART

Secondary batteries have come into widespread use, not just as power supplies for portable devices such as mobile phones, digital cameras and laptop computers, but as power supplies for vehicles and household appliances. From among the different kinds of secondary batteries, lithium ion secondary batteries, which have high-energy density and are lightweight, are energy storage devices that have become essential in daily life.

Secondary batteries are generally classified into spiral-wound type secondary battery and laminated type secondary battery. A battery electrode assembly of a spirally-wound type secondary battery has a structure in which a long positive electrode sheet and a long negative electrode sheet overlap each other with a separator interposed therebetween are spirally wound in a plurality of turns. A battery electrode assembly of a laminated type secondary battery has a structure in which positive electrode sheets and negative electrode sheets are alternately laminated with separators interposed therebetween. In both a spiral-wound type secondary battery and a laminated type secondary battery, a battery electrode assembly and an electrolyte are contained in an exterior container. Patent Documents 1 and 2 each disclose a configuration in which a sheet having high thermal conductivity is wound around a battery electrode assembly.

PRIOR ART DOCUMENTS

Patent Documents

Patent Document 1: JP2008-117604A
Patent Document 2: JP10-40959A

SUMMARY OF INVENTION

Problem to be Solved by the Invention

In the configurations described in Patent Documents 1 and 2, the sheet having high thermal conductivity is wound around the battery electrode assembly, and heat that is generated during charging and discharging of a battery is released to the outside through the sheet having high thermal conductivity, thereby reducing any adverse effect that heat generation may cause to the battery characteristics.

However, if a sharp metal object such as a nail penetrates a secondary battery, this will cause an electrical short-circuit between the positive and negative electrodes through the metal object, which results in the flow of an excessive amount of current and heat generation within the secondary battery which may lead to an explosion or a fire. In particular, because of the tendency to increase the capacity of secondary batteries yearly, the amount of heat that will be generated in case of electrical short-circuits will also increase, and the amount of heat that a sheet, which has high thermal conductivity such as the sheets described in Patent Documents 1 and 2, can release, will be insufficient. Therefore, further safety measure of the secondary batteries is requested.

The object of the present invention is to provide a secondary battery that can reduce battery failure that occurs when a foreign object penetrates the positive and negative electrodes and causes an electrical short-circuit.

Means to Solve the Problem

A secondary battery comprises: a battery electrode assembly that includes positive electrodes and negative electrodes that overlap each other with a separator interposed therebetween; and a conductive adhesive tape which has a multilayer structure including an adhesive layer and a conductive layer, wherein the adhesive layer has conductivity and adhesiveness and adheres to a surface of said battery electrode assembly, the conductive layer is laminated on said adhesive layer, and the conductive adhesive tape has electric resistance of 1.0 $\Omega/cm^2$ or less in a thickness direction and covers at least a part of an outer peripheral portion of said battery electrode assembly by being wound around said part.

Advantageous Effects of Invention

According to the present invention, it is possible to reduce failure caused by the electrical short-circuit of a positive electrode and a negative electrode when a foreign object penetrate the positive and negative electrodes.

BRIEF DESCRIPTION OF DRAWINGS

FIG. 2b is a cross-sectional view of the secondary battery illustrated in FIG. 1, the cross-sectional view being cut along the width direction.

FIG. 3 is an enlarged cross-sectional view illustrating a state where a foreign object penetrates the secondary battery illustrated in FIG. 1.

FIG. 4 is an exploded perspective view illustrating a secondary battery of a second exemplary embodiment of the present invention.

DESCRIPTION OF EXEMPLARY EMBODIMENTS

Hereinafter, exemplary embodiments of the present invention will be described with reference to the drawings.

Figure 1:
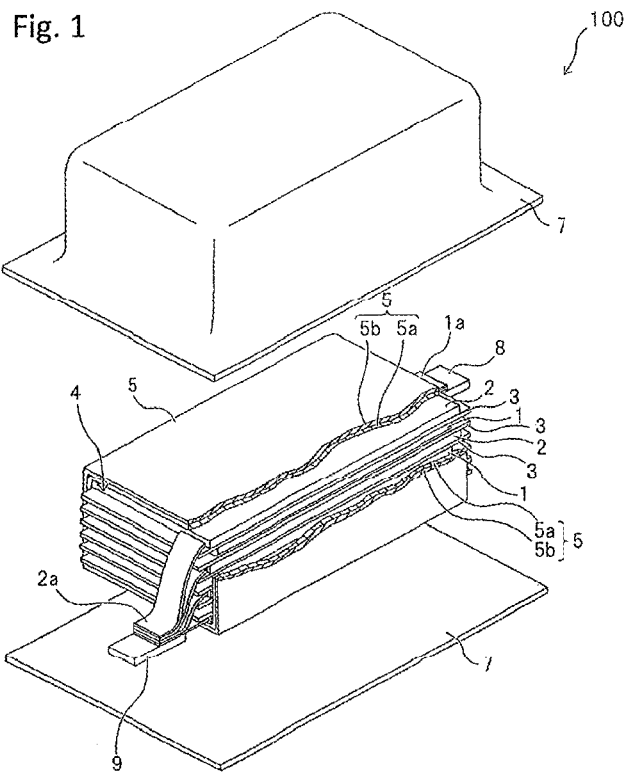
FIG. 1 is an exploded perspective view illustrating a secondary battery of a first exemplary embodiment of the present invention.
Figure 2A:
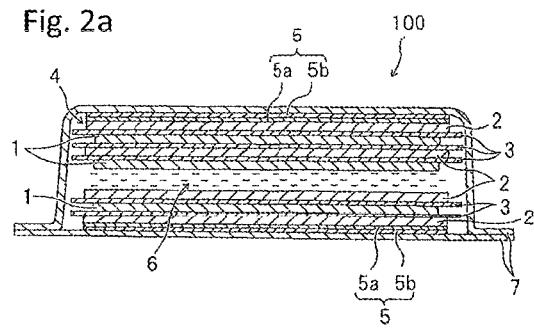
FIG. 2a is a cross-sectional view of the secondary battery illustrated in FIG. 1, the cross-sectional view being cut along the longitudinal direction.

FIGS. 1, 2a and 2b schematically illustrate an example of a configuration of a laminated type lithium ion secondary battery according to the present invention. Lithium ion secondary battery 100 of the present invention includes an electrode laminate (battery electrode assembly) 4 that includes positive electrodes 1 and negative electrodes 2 alternately laminated with separators 3 interposed therebetween. Electrically conductive adhesive tape 5 is wound around this electrode laminate 4. Electrically conductive adhesive tape 5 has a multilayer structure, in which a layer located inside is adhesive layer 5a having conductivity and adhesiveness, and a layer located outside is conductive layer 5b. Electrode laminate 4 that is covered with conductive adhesive tape 5 and electrolyte 6 are contained in an exterior container. FIGS. 2a and 2b illustrate electrolyte 6 by omitting a part of respective layers (layers located at an intermediate part in the thickness direction) forming electrode laminate 4 in the drawing.

As illustrated in FIG. 1, positive electrodes 1 and negative electrodes 2 are provided with tabs 1a, 2a, respectively, positive electrode tabs 1a are connected to one end of positive electrode terminal 8, negative electrode tabs 2a are connected to one end of negative electrode terminal 9. The other end of positive electrode terminal 8 and the other end of negative electrode terminal 9 are drawn out to the outside of an exterior container. The outside dimensions of negative electrodes 2 are larger than the outside dimensions of positive electrodes 1, and are smaller than the outside dimensions of separators 3. In secondary battery 100, adhesive layer 5a that is an inner layer of conductive adhesive tape 5 is closely adhered to negative electrodes 2 located on a surface of electrode laminate 4, and is electrically connected.

Adhesive layer 5a of conductive adhesive tape 5 of this exemplary embodiment is formed of a mixture that is obtained by mixing a conductive filler (such as conductive resin, carbon particles, and metal particles) in an acrylic adhesive, for example. Conductive layer 5b is formed of conductive nonwoven fabric obtained by plating metal such as copper and nickel onto nonwoven fabric formed of polyester or the like, or metal such as copper and aluminum.

As the exterior container, a case made of flexible film or a can case can be used. From the point of view of battery weight reduction, using a case formed of flexible film 7 is preferable. Flexible film 7 has a multilayer structure in which resin layers that are provided on both front and rear surfaces of a metal layer as a base material can be used, for example. In this case, as the metal layer, a layer having barrier properties which may be properties for preventing leakage of electrolyte 6 and infiltration of moisture from outside is preferably selected, and aluminum, stainless steel or the like can be used. A thermally-fusible resin layer such as modified polyolefin is provided on at least one surface of the metal layer. The thermally-fusible resin layers of flexible film 7 are opposite to each other and are thermally fused to each other at a part that surrounds the space for containing electrode laminate 4, thereby an exterior case is formed. A resin layer such as a nylon film and a polyester film may be provided on the surface of the exterior container opposite to the surface on which the thermally-fusible resin layer is formed. In an example illustrated in FIG. 1, an emboss portion for containing electrode laminate 4 is formed in flexible film 7 located on an upper side. However, emboss portions may be formed in both flexible films 7. Additionally, no emboss portion may be previously formed, electrode laminate 4 may be contained by deforming flexible films 7 when electrode laminate 4 is inserted between a pair of flexible film 7.

FIG. 3 schematically illustrates two routes of an electrical short-circuit in a case where a foreign object (for example, metal piece such as a nail) 10 is stuck into secondary battery 100. First of all, in a case where foreign object 10 penetrates secondary battery 100, electrode(s) 1 and adjacent negative electrode(s) 2 are sometimes electrically short-circuited by foreign object 10. In the present invention, a current flowing due to this electrical short-circuit is guided to conductive adhesive tape 5 that covers electrode laminate 4. Specifically, as schematically illustrated by the arrow in FIG. 3, positive electrodes 1 and negative electrodes 2 adjacent to positive electrodes 1 are short-circuited through foreign object 10, and a current is guided from negative electrodes 2 to conductive layer 5b located outside electrode laminate 4 through adhesive layer 5a adhered to electrode laminate 4. Then, a current flows again from conductive layer 5b to negative electrodes 2 through adhesive layer 5a. This is because conductive adhesive tape 5 of this exemplary embodiment has low electric resistance of 1.0 $\Omega/cm^2$ or less in the thickness direction, and therefore current is easily transmitted in the thickness direction of conductive adhesive tape 5. As a result, current flows along a path that acts as a passage for current to travel from positive electrodes 1 and negative electrodes 2 to conductive layer 5b, which is an outer layer of conductive adhesive tape 5, and thereafter returns to negative electrodes 2.

In another route of an electrical short-circuit schematically illustrated in FIG. 3, current from positive electrodes 1 of electrode laminate 4 is guided to conductive layer 5b through foreign object 10, and flows from conductive layer 5b to negative electrodes 2 of electrode laminate 4 through adhesive layer 5a. It is thought that the position where current flows to negative electrodes 2 in this route does not coincide with the position where current flows to negative electrodes 2 in the above another route, and is a separated position. That is, in the two examples of the electrical short-circuit schematically illustrated in FIG. 3, the positions where current flows to negative electrodes 2 are different from each other. Thus, the paths through which current flows to generate a short circuit are dispersed, and an excessive amount of short circuit current does not flow only at a specified position (near foreign object 10) inside electrode laminate 4. Therefore, generated heat is dispersed, and generation of a large amount of heat at a specified position is pre vented. Heat generated due to current flowing to conductive adhesive tape 5 located outside electrode laminate 4 is transferred to air interposed between exterior film 7 and the heat, and is further discharged to the outside through exterior film 7, and therefore an excessive temperature rise of electrode laminate 4 itself is prevented.

According to the present invention, in a case where foreign object 10 such as a nail penetrates secondary battery 100, an excessive current is prevented from flowing at the specified position (near foreign object 10) inside electrode laminate 4. As a result, it is possible to eliminate or reduce the risk of generating a large amount of heat inside electrode laminate 4 to cause an explosion or a fire. Consequently, safety during use of secondary battery 100 is highly improved. In order to create this effect, conductive adhesive tape 5 of this exemplary embodiment has adhesive layer 5a provided with adhesiveness and conductivity as an inner layer, and has low electric resistance of 1.0 $\Omega/cm^2$ or less in the thickness direction.

If a non-adhesive layer which does not have adhesiveness is used in place of adhesive layer 5a, adhesion with an electrode (negative electrode 2 in this exemplary embodiment) located at an outermost layer of electrode laminate 4 will be low, and therefore current is unlikely to be guided from the electrode located at the outermost layer to the non-adhesive layer. Therefore, inside electrode laminate 4, an excessive amount of current will flow only through the shortest path where positive electrodes 1 and negative electrodes 2, which are adjacent to each other, are short-circuited through foreign object 10, and the possibility is high that an excessive current will flow at a position on the path (near foreign object 10) to cause generation of a large amount of heat. Additionally, if electric resistance in the thickness direction of the conductive adhesive tape is large, even when adhesive layer 5a located on the inner side has adhesiveness, current is unlikely to be guided to conductive layer 5b located on the outer side, and there is a high possibility that an excessive amount of current will flow only at the specified position (near foreign object 10) inside electrode laminate 4 to cause a large amount of heat to be generated. Like the present invention, electrode laminate 4 is covered by conductive adhesive tape 5 having adhesive layer 5a provided with adhesiveness and conductivity as an inner layer, and has low electric resistance of 1.0 $\Omega/cm^2$ or less in the thickness direction, so that current is dispersed to flow not only through the shortest route but also through the two routes illustrated in FIG. 3, and therefore the effect of preventing excessive heat generation inside electrode laminate 4 is obtained.

Conductive adhesive tape 5 preferably covers all of electrode laminate 4, but may have a configuration in which only a part of electrode laminate 4 is covered. In this way, a positive effect will be achieved by having conductive adhesive tape 5 cover the central portion of electrode laminate 4 because there is a relatively high possibility that foreign object 10 will penetrate the central portion.

Figure 5:
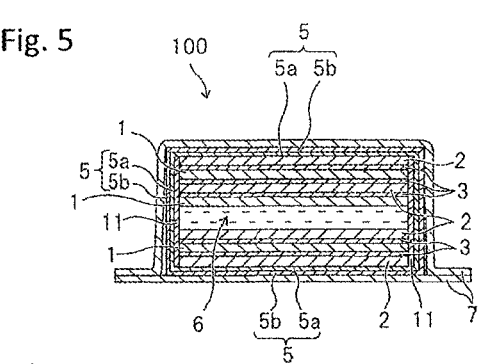
FIG. 5 is a cross-sectional view of the secondary battery illustrated in FIG. 4, the cross-sectional view being cut along the width direction.

FIGS. 4 and 5 illustrate a secondary battery of a second exemplary embodiment of the present invention. In this exemplary embodiment, insulating members 11 that are formed of, for example, insulating resin films, and that cover side surfaces of electrode laminate 4 are provided. Insulating members 11 prevent side edges of positive electrodes 1 and side edges of negative electrodes 2 from coming into contact with adhesive layer 5a of conductive adhesive tape 5, and prevent positive electrodes 1 and negative electrodes 2 from being electrically short-circuited through adhesive layer 5a of conductive adhesive tape 5 at the respective side edges. Other configurations are the same as the configurations of the first exemplary embodiment, and therefore description thereof will be omitted.

As illustrated in FIGS. 1, 2a and 2b, in the configuration in which insulating members 11 are not provided, in order to prevent an electrical short-circuit between positive electrodes 1 and negative electrodes 2, the dimensions of the respective members need to be suitably adjusted such that at least the side edges of positive electrodes 1 and/or the side edges of negative electrodes 2 are not in contact with adhesive layer 5a of conductive adhesive tape 5. In the example illustrated in FIGS. 1, 2a and 2b, the dimensions of positive electrodes 1 are reduced. However, in this exemplary embodiment, the dimensions of respective members do not need to be adjusted, and it is possible to effectively prevent a short circuit.

As in the case of the first exemplary embodiment, even if foreign object 10 such as a nail penetrates secondary battery 100 and a part of positive electrodes 1 and a part of negative electrodes 2 that are adjacent to each other are electrically short-circuited, a portion of the current that results from the short circuit flows through the path that acts as a passage where current flows through conductive layer 5b of conductive adhesive tape 5 and then returns to negative electrodes 2. Additionally, a route where short circuit current flows from positive electrodes 1 of electrode laminate 4 to negative electrodes 2 of electrode laminate 4 through foreign object 10, conductive layer 5b, and adhesive layer 5a is also created. Therefore, excessive amount of current which flows only at the specified position (near foreign object 10) inside electrode laminate 4 is prevented. As a result, it is possible to eliminate or reduce the risk of generating large amount of heat inside electrode laminate 4 to cause an explosion or a fire.

Figure 6:
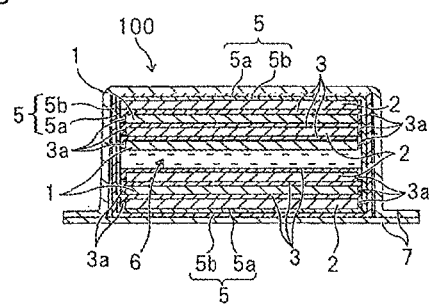
FIG. 6 is a cross-sectional view of a modification of the secondary battery of the second exemplary embodiment of the present invention, the cross-sectional view being cut along the width direction.

FIG. 6 illustrates a modification of the secondary battery of this exemplary embodiment. In this modification, side portions of separators 3 are bent, and bent portions 3a function as insulating members that prevent short circuiting between positive electrodes 1 and negative electrodes 2. That is, bent portions 3a of separators 3 cover side edges of positive electrodes 1 and side edges of negative electrodes 2 so that they do not come into contact with conductive layer 5b of conductive adhesive tape 5, and therefore positive electrodes 1 and negative electrodes 2 are not electrically short-circuited through conductive layer 5b. As in the case of the configuration illustrated in FIGS. 4 and 5, the dimensions of respective members do not need to be adjusted, and it is possible to effectively prevent a short circuit. Additionally, even when foreign object 10 penetrates the electrode laminate and an electrical short-circuit occurs, part of the current that is caused by the short circuit flows through the path that acts as a passage for current to flow through conductive layer 5b of conductive adhesive tape 5 and then returns to negative electrodes 2. Additionally, a path where a short circuit current flows from positive electrodes 1 of electrode laminate 4 to negative electrodes 2 of electrode laminate 4 through foreign object 10, conductive layer 5b, and adhesive layer 5a is also created. Therefore, an excessive amount of current does not flow only at a specified position (near foreign object 10) inside electrode laminate 4. Therefore, it is possible to eliminate or reduce the risk of generating a large amount of heat inside electrode laminate 4 to cause an explosion or a fire.

In this modification, in order to prevent a short circuit in the side edges of positive electrodes 1 and in the side edges of negative electrodes 2, only one part of separator 3 needs to be bent, and insulating members do not need to be prepared as separate members, positioning of the insulating member is unnecessary, and manufacturing steps are not complicated.

In the example illustrated in FIG. 6, bent portions 3a are formed in all separators 3, both the side edges of positive electrodes 1 and the side edges of negative electrodes 2 are not in contact with adhesive layer 5a of conductive adhesive tape 5. However, even when only one of the side edges of positive electrodes 1 and the side edges of negative electrodes 2 are not in contact with adhesive layer 5a of conductive adhesive tape 5, the result is that a short circuit is prevented. In this case, although not illustrated, bent portions 3a may be formed in only some of separators 3 (roughly a half of separators 3).

Figure 7A:
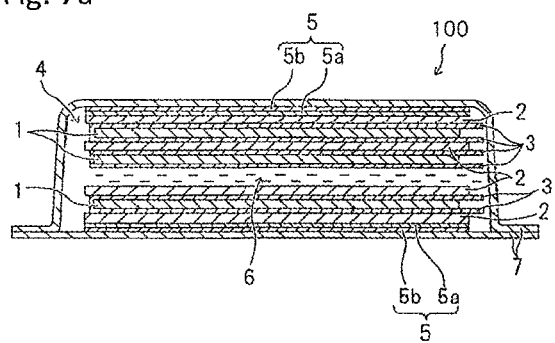
FIG. 7a is a cross-sectional view of a secondary battery of a third exemplary embodiment of the present invention, the cross-sectional view being cut along the longitudinal direction.
Figure 7B:
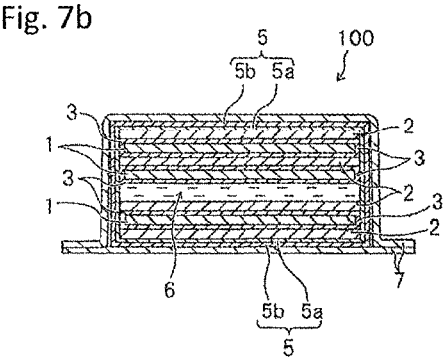
FIG. 7b is a cross-sectional view of the secondary battery of the third exemplary embodiment of the present invention, the cross-sectional view being cut along the width direction.

FIGS. 7a and 7b illustrate a secondary battery of a third exemplary embodiment of this exemplary embodiment. In this exemplary embodiment, separators 3 each are formed in a bag shape for containing positive electrode 1. That is, each separator 3 is formed in the bag shape that has one edge with an opening (right edge in FIG. 7a), and three closed edges (left edge in FIG. 7a and right and left edges in FIG. 7b) other than the one edge that has an opening. Bag-shaped separators 3 contain respective positive electrodes 1 therein. Bag-shaped separators 3 that contain respective positive electrodes 1, and negative electrodes 2 are alternately laminated, so that it is possible to easily implement a configuration in which positive electrodes 1 and negative electrodes 2 are alternately laminated with separators 3 interposed therebetween. In this configuration, the side edges of positive electrodes 1 are not exposed but are covered with separators 3, and therefore are not in contact with conductive layer 5b of conductive adhesive tape 5 and it is possible to easily prevent a short circuit in the side edges. Even when foreign object 10 penetrates the electrode laminate and an electrical short-circuit occurs, part of the current that is caused by the short circuit flows through the path that acts as a passage for current to flow through conductive layer 5b of conductive adhesive tape 5, and then returns to negative electrodes 2. Additionally, a path where a short circuit current flows from positive electrodes 1 of electrode laminate 4 to negative electrodes 2 of electrode laminate 4 through foreign object 10, conductive layer 5b, and adhesive layer 5a is also created. Therefore, an excessive amount of current does not flow only at a specified position (near foreign object 10) inside electrode laminate 4, and it is possible to eliminate or reduce the risk of generating a large amount of heat to cause an explosion or a fire.

Each bag-shaped separator illustrated in FIGS. 7a and 7b can be formed by folding a long separator sheet in half, and bonding overlapped parts in two edges other than the part that has been folded in half by heat welding or the like. Additionally, each bag-shaped separator can be formed by overlapping two sheets of separators and bonding three edges. In either case, positive electrode 1 is inserted from one edge which is not bonded and opened, so that bag-shaped separator 3 can contain positive electrode 1 therein. Of course, it could be that separator 3 does not contain positive electrode 1 but does contain negative electrode 2 therein.

In this exemplary embodiment, insulating members do not need to be separately prepared, and an electrical short-circuit can be easily prevented. In addition, laminating positive electrodes 1 and negative electrodes 2 with separators 3 interposed therebetween is easily performed.

As described above, according to the present invention, when positive electrodes 1 and negative electrodes 2 are electrically short-circuited, which results from foreign object 1 penetrating the electrode laminate, current is guided from positive electrodes 1 and negative electrodes 2, which have been penetrated by foreign object 10, to conductive layer 5b through conductive adhesive layer 5a of conductive adhesive tape 5. That is, a part of a current generated due to an electrical short-circuit flows through the path that acts as a passage for current to flow through conductive layer 5b of conductive adhesive tape 5 that is wound around electrode laminate 4 and then returns to negative electrodes 2. Additionally, a path where a short circuit current flows from positive electrodes 1 of electrode laminate 4 to negative electrodes 2 of electrode laminate 4 through foreign object 10, conductive layer 5b, and adhesive layer 5a is also created. Therefore, an excessive amount of current is prevented from flowing only at a specified position (near foreign object 10) inside electrode laminate 4. As a result, it is possible to prevent an explosion or a fire that is caused by large amount of heat that is generated through electrode laminate 4.

The above respective exemplary embodiments each relate to a laminated type secondary battery. However, in a spiral-wound type secondary battery as well, it is possible to obtain an effect similar to the above effect, by employing a configuration similar to the configurations of the first and second exemplary embodiments.

Thus, the present invention is described with reference to several exemplary embodiments. However, the present invention is not limited to the configurations of the above exemplary embodiments, and various changes understood by a person skilled in the art can be applied to the configuration and details of the present invention within the scope of a technical idea of the present invention.

The present application claims priority to Japanese patent application No. 2014-91108 filed on Apr. 25, 2014, and the entire disclosure of Japanese patent application No. 2014-91108 is herein incorporated.

The invention claimed is:

1. A secondary battery comprising:
   a battery electrode assembly that includes positive electrodes and negative electrodes that overlap each other with a separator interposed therebetween; and
   a conductive adhesive tape which has a multilayer structure including an adhesive layer and a conductive layer, wherein the adhesive layer has conductivity and adhesiveness and adheres to a surface of said battery electrode assembly, the conductive layer is laminated on said adhesive layer, and the conductive adhesive tape has electric resistance of 1.0 $\Omega/cm^2$ or less in a thickness direction of the conductive adhesive tape and covers at least a part of an outer peripheral portion of said battery electrode assembly by being wound around said part.

2. The secondary battery according to claim 1, further comprising an insulating member which is located on a side surface of said battery electrode assembly and which covers at least one of a side edge of said positive electrode and a side edge of said negative electrode such that the covered side edge is not in contact with said adhesive layer.

3. The secondary battery according to claim 2, wherein said insulating member is a bent portion formed in a side portion of said separator.

4. The secondary battery according to claim 1, wherein said separator is in a bag shape, and said positive electrode or said negative electrode is contained inside said bag-shaped separator, said battery electrode assembly comprises said bag-shaped separator containing said positive electrode or said negative electrode, and the remaining electrode, which is either said positive electrode or said negative electrode, said bag-shaped separator and said remaining electrode being alternately laminated on each other.

5. The secondary battery according to claim 1, wherein said adhesive layer of said conductive adhesive tape contains a conductive filler.

6. The secondary battery according to claim 2, wherein said adhesive layer of said conductive adhesive tape contains a conductive filler.

7. The secondary battery according to claim 3, wherein said adhesive layer of said conductive adhesive tape contains a conductive filler.

8. The secondary battery according to claim 4, wherein said adhesive layer of said conductive adhesive tape contains a conductive filler.

\* \* \* \* \*